United States Patent Office 2,837,534
Patented June 3, 1958

2,837,534

PROCESS FOR EXTRACTING PYRETHRIN SYNERGISTS FROM SESAME OIL

Ralph L. Tracy, Miller Place, N. Y., assignor to Norda Essential Oil & Chemical Company, New York, N. Y., a corporation of New York No Drawing. Application June 11, 1956
Serial No. 590,364

8 Claims. (Cl. 260—340.5)

This invention relates to a process for the extraction of pyrethrin synergists from sesame oil, and, more particularly, to a process for the extraction of sesamin, sesamolin and other pyrethrin synergistic components from sesame oil, using γ-butyrolactone as the extracting solvent.

In 1940, Eagleson, U. S. Patent No. 2,202,145, disclosed the synergistic action of sesame oil for pyrethrins, rotenone and the like insect toxins. The sesame oil was said both to reduce the necessary concentration of insect toxin required to produce 100 percent mortality of the insects and to prolong the paralysis or torpor of such insects as are not hit with sufficient insecticide actually to produce death. This increment in toxicity was shown by Eagleson to be due to a synergistic relationship, and not merely to the addition of another toxin, because of the failure of sesame oil alone to kill flies. It demonstrates this enhanced activity only in the presence of the pyrethrins, rotenone, and the like.

Eagleson's report provoked considerable research to elucidate the nature of the pyrethrin synergists in sesame oil. Haller and his co-workers, Journal of Organic Chemistry 7, 183–5 (1942), and Journal of Economic Entomology 35, 247–8 (1942), fractionated sesame oil by molecular distillation and from the two most active fractions isolated sesamin. Later, in the Journal of Organic Chemistry 7, 185–8 (1942), these workers reported that the methylenedioxyphenyl group was essential for sesamin's synergistic activity. Sesamin has the formula:

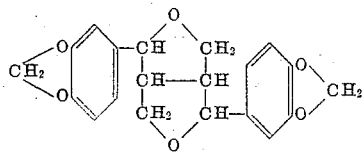

As a result of this work, a number of synthetic synergists containing this group were developed, which have become commercially important.

Haller and his co-workers, and also Parkin and Green, Nature 154, 16 (1944), recognized that considerable synergistic activity remained after the removal of sesamin from the oil. Beroza, the Journal of the American Oil Chemists Society 31, 302–305 (1954), showed by chromatographic fractionation that sesamolin also is responsible for a considerable synergistic activity. Sesamolin had been known, having originally been isolated in 1903 by Canzoneri and Perciabosco, Gazz. chim. ital. 33, II, 253–260 (1903). Beroza found that sesamolin was about 5 times as active as sesamin, and that crude sesame oil usually contains about 0.3 to 0.5 percent of sesamolin and 0.5 to 1 percent of sesamin. Beroza thus attributed most of the synergistic action of sesame oil to sesamolin rather than to sesamin. The formula for sesamolin was suggested to be as follows:

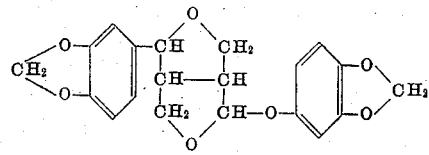

This structure was later verified, Journal of the American Chemical Society 77, 3332–3334 (1955).

Sesamol, an antioxidant that gives excellent protection to vegetable oils against rancidity, also occurs in sesame oil in free form. Dilute mineral acids or hydrogenation transform sesamolin into sesamol, to which the stabilization of sesame oil by hydrogenation is undoubtedly due. Sesamol is not active as a pyrethrin synergist. Sesamol has the structure:

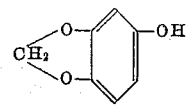

Accompanying these disclosures of the nature of the pyrethrin synergists in sesame oil, there has of course been a parallel series of disclosures of methods of obtaining synergistic concentrates from sesame oil. Simanton in U. S. Patent No. 2,463,324, dated March 1, 1949, describes the extraction of sesame oil with lower alcohols such as methanol, ethanol, ethylene glycol monomethyl ether and mixtures of these alcohols with ketones such as acetone, methyl ethyl ketone, mesityl oxide and the like. Simanton uses a series of extractions, in each extraction using an amount of solvent at least about equal to the amount of oil treated. The extracts are then combined and the solvent distilled. The extraction is carried out at a moderate temperature, somewhat above room temperature and below the boiling point of the solvent. The residue obtained after distilling off the solvent is described as an oily material, fluid at 125° F., from which sesamin is recoverable together with a second crystalline compound having a melting point of 92° C. and a high synergistic activity. This latter material probably is sesamolin.

Omohundro, Fanto, and Reich, U. S. Patent No. 2,467,903, patented April 19, 1949, describe a similar extraction process utilizing methyl, ethyl, isopropyl, and n-propyl alcohols or acetone. The sesamin extract thus obtained is further purified and concentrated by treatment with a low boiling petroleum fraction, such as petroleum ether. In this way, it is claimed that 50 to 70 percent of the sesamin originally contained in the oil can be recovered as the crude extract, while from 100 lbs. of the concentrate 26 lbs. of the highly active material can be recovered. It is apparent that the efficiency of these solvents leaves much to be desired.

In accordance with the invention, the active pyrethrin synergists in sesame oil are separated therefrom by extraction utilizing γ-butyrolactone as the extracting medium. The oil is mixed with a suitable volume of γ-butyrolactone, within the range of from 0.25 to about 4 or more volumes of γ-butyrolactone per volume of the oil, heated to 130° C. or above but below the boiling point of the γ-butyrolactone, the heating continued for a time to ensure complete solution of the oil and the γ-butyrolactone, forming a homogeneous liquid, and the solution cooled to 60° C. or below and allowed to stand until two layers have formed. The γ-butyrolactone separates as the bottom layer, and the extracted sesame oil forms the top layer. The layers are separated and the oil centrifuged to remove any residual γ-butyrolactone. The γ-butyrolactone layers are combined, and the solvent removed, leaving a residue constituting substantially all of the pyrethrin synergist content of the sesame oil.

The process of the invention is extraordinarily efficient, inasmuch as the γ-butyrolactone and the sesame oil are completely miscible in the proportions indicated at 130° C. and above, thus ensuring that the pyrethrin synergist content of the oil will be dissolved in the γ-butyrolactone at this temperature, while at temperatures below 60° C. the γ-butyrolactone is substantially immiscible in the sesame oil. In fact, only approximately 10 percent maximum of γ-butyrolactone will be found dissolved in the oil at 60° C., and even this amount can be reduced by further cooling of the oil to room temperature or below. The sesamolin and sesamin are more soluble in the γ-butyrolactone than in the oil, so that when separation of the oil and γ-butyrolactone occurs at the lower temperature, the sesamin and sesamolin remain dissolved in the γ-butyrolactone, together with sesamol and other constituents of unknown nature.

At least 0.25 volume of γ-butyrolactone should be used per volume of sesame oil, in order to obtain substantially complete extraction of the pyrethrin synergists in the oil. However, there is no critical upper limit on the amount of solvent. Six and eight volumes per volume of sesame oil have been used with good results. The more solvent used, the more certain a complete extraction will be obtainable. However, since the solvent must be removed at the conclusion of the process, the more solvent added, the more that must be removed later. In a commercial process, it would be uneconomical to process unnecessarily large volumes of solvent. Therefore, usually from 0.25 to 4 volumes of γ-butyrolactone per volume of sesame oil would be used.

The temperature to which the mixture of γ-butyrolactone and oil is heated likewise is not critical, provided it is sufficiently high to ensure a homogeneous solution. A homogeneous solution is obtained at temperatures of 130° C. and above. γ-Butyrolactone boils at 204° C. at 760 mm., and hence the solution would ordinarily be heated to a temperature within the range from 130° to 204° C.

The temperature to which the solution is cooled at the conclusion of the extraction likewise is not critical. The temperature should be below 60° C., below which temperature γ-butyrolactone is substantially completely immiscible with sesame oil. Room temperature is a convenient temperature. At temperatures below room temperature, refrigeration will be necessary, so that although a greater separation may be obtainable, this is offset commercially by the cost of the refrigeration.

Even though the γ-butyrolactone may be immiscible in the sesame oil, all of the γ-butyrolactone may not separate from the oil simply on standing. Such occluded or entrained oil can be removed by centrifuging or filtration.

The time during which the solution is held at the elevated temperature and at the lower final temperature will depend upon the time necessary in the first instance to ensure a homogeneous solution and in the second instance to ensure a complete separation. Usually, twenty minutes is sufficient in the former, although times up to one hour have been used without difficulty. A complete separation by gravity of the oil and γ-butyrolactone at temperatures of 60° C. and below will usually take place within a few hours.

The sesame oil which is obtained following the separation may contain a very small quantity of γ-butyrolactone which is soluble in the oil. This material can be removed by washing the oil with water or with caustic alkali.

Caustic alkali treatment results in the conversion of the lactone to the sodium salt of γ-hydroxybutyric acid, and saponification of the oil if caustic is employed under suitable refining conditions, as known to those skilled in the art, resulting in the hydrolysis of the esters present in sesame oil to the corresponding fatty acids.

The process is applicable to sesame oil obtained from any source. The solvent extraction can be made directly on the oil, and it can also be made on the sesame seed, for example, dehulled sesame seed and toasted sesame seed. However, in the latter case the heating at 130° C. and above may have to be continued for a longer time in order to ensure complete extraction of the oil from the seed. Usually, sesame oil itself would be the starting material.

The butyrolactone extract which is obtained at the conclusion of the process may contain a small amount of sesame oil. This can be removed by any of several ways.

In one procedure, the γ-butyrolactone is removed by distillation, forming a residue which is thick and turbid and contains the solid synergistic materials in addition to some sesame oil. The oil can be separated by a further γ-butyrolactone extraction, as before, using two to three volumes of γ-butyrolactone per volume of the solid material. After separation of the oil and distillation of the γ-butyrolactone, a pure residue is obtained which should solidify at from 15 to 20° C.

The oil contained in the residue also can be removed by washing with isopropyl ether. However, isopropyl ether will also remove variable amounts of sesamin and sesamolin, so that this results in a lessened yield unless the oil thus removed is recovered and recycled, as could readily be done in a continuous process.

The sesamin and sesamolin can be extracted from the residue of the butyrolactone extract by the following procedure: To the residue is added four volumes of isooctane, hexane, petroleum ether or kerosene, and this is mixed thoroughly at room temperature and filtered. The sesamin oil together with various amounts of active synergistic substances is removed by the solvent, leaving a residue of solids of crystalline structure, rich in sesamin and sesamolin. This residue after drying has a melting point within the range of 100 to 114° C.

The filtrate is distilled to remove the solvent, leaving an oily residue. Sesamin and sesamolin may crystallize from this oily residue upon standing. However, it is preferable to saponify the oily residue with calcium hydroxide at room temperature, without cooling, while vigorously agitating the mixture. The reaction is slightly exothermic. The amount of calcium hydroxide which can be used is selected to bring the pH of the mixture to a maximum of 7.7, and sufficient water should be used throughout to produce a free flowing mixture which is easily agitated. If the pH exceeds 8.0 the concentration of synergistic substances is significantly reduced; at a pH of 10 synergistic substances are destroyed.

The saponified residue is extracted with two to four volumes of nitromethane, and the extractions are repeated until the synergistic substances are completely removed. Usually one extraction for 10 to 20 minutes at 25° C. with vigorous agitation is sufficient for complete removal. The nitromethane solution can be filtered if desired and is distilled in vacuo at 20 mm. and 40 to 50° C. The residue is either a solid or an oil which solidifies nearly completely after standing at room temperature down to 5° C. for 24 hours. The solids resulting from the nitromethane extraction are pooled with the solids that were washed with isooctane. The mixture is highly synergistic and strongly Villavecchia positive, indicating a significant concentration of sesamolin. The melting range varies from about 95 to 100° C.

Sodium or potassium hydroxide can be used instead of calcium hydroxide for the saponification, but in this case the soap and other materials in the saponified material are significantly soluble in the nitromethane, and the residue will contain high concentrations of oils, soaps and other fat-like substances. Solvents other than nitromethane such as benzene, ethylene dichloride, carbon tetrachloride, methanol, acetone and isopropyl ether fail to extract the sesamin and sesamolin completely, and dissolve in addition the soaps, water and other undesirable products in the residue.

The solid material can be separated into its major components, sesamin, and sesamolin, by extraction with a lower aliphatic alcohol having at least four carbon atoms and preferably not over six carbon atoms, for example, butyl and amyl alcohols. Amyl alcohol has the advantage of having a high solubility both for sesamin and for sesamolin at elevated temperatures approaching the reflux temperature of the alcohol, and substantially no solubility for sesamin at room temperature.

Sufficient alcohol is used to form a 10 to 20% solution of the residue at the reflux temperature of the alcohol or below. The solution then is cooled to 45° C., at which temperature sesamin precipitates in the form of nearly pure crystals. These are separated by filtration. The residue in solution, that is, in the filtrate, is composed of some sesamolin, sesamin, and sesamol, and oily components. This mixture is recovered by simple distillation of the alcohol.

The less alcohol that is used, and the lower the temperature of the solution at the time of filtration, the greater the concentration of sesamolin in proportion to the sesamin that the filtrate will contain. The proportion of sesamolin to sesamin will be greater than in the natural product. Since sesamolin is more active synergistically than sesamin, such an increase in the proportion thereof enhances the synergistic activity of the product. Actually, the ratio of sesamin and sesamolin in the final product can be adjusted at will simply by adding pure sesamin or sesamolin thereto, thus forming a final product containing these materials in any desired proportions.

It has been determined that a product having optimum synergistic activity is obtained when the proportion of sesamolin is at least 35%, and the proportion of sesamin is within the range from about 40 to about 60%, the remainder being synergistically inert fatty or waxy compounds. The melting point of this product ranges from 90 to 105° C.

The process is adapted for operation as a batch process and as a continuous extraction. In the case of the latter, a stream of γ-butyrolactone would be blended with a stream of sesame oil and conducted to a heating unit where it would be heated to 130° C. or above for a sufficient holding time to permit complete solution. The solution leaving this unit then would be conducted to a cooling chamber where it would be cooled to 60° C. or below so that the two layers would separate, and thence to a centrifuge where the oil and the γ-butyrolactone would be separated and conducted to other treating apparatus as required. γ-Butyrolactone would be passed to a distillation unit where the solvent would be distilled and the residue washed if desired or recovered and used in an impure and crude condition.

The following examples represent the best mode in the opinion of the inventor of the operation of his invention.

EXAMPLES 1 TO 7

Sesame oil (crude, obtained from crushed dehulled sesame seed) was blended with the volume of γ-butyrolactone indicated in the table below and heated to 130° C., using good agitation to ensure intimate mixing. The turbid mixture became crystal-clear at this temperature, after heating with stirring for twenty minutes.

The resulting solution was cooled to 30° C. slowly, with agitation. The mixture then was allowed to separate by standing overnight. The γ-butyrolactone formed the bottom layer and the oil the top layer. The layers were separated by physical means, and the oil centrifuged. The clear oil was separated from the centrifugate and the recovered γ-butyrolactone pooled with the γ-butyrolactone separated from the oil by standing overnight.

The γ-butyrolactone was distilled at 85° C. at 4 to 5 mm. pressure. 99.5% of the γ-butyrolactone was recovered.

The residue was thick, turbid, and contained an appreciable solids content. After distillation of the γ-butyrolactone, a concentrate was obtained which solidified at 15° C., being thick and turbid with appreciable solids content.

Using the above procedure, in a series of extractions using the volumes of γ-butyrolactone indicated in Table I, the following amounts of pyrethrin synergist fractions were obtained.

*Table 1*

| Example No. | Volume of Sesame Oil | Volume of Butyrolactone | Sesame Oil | | γ-Butyrolactone | | Pyrethrin Synergist Fraction | |
|---|---|---|---|---|---|---|---|---|
| | | | Vol., ml. | Wt., g. | Vol., ml. | Wt., g. | g. | Percent w./w. |
| 1 | 1 | 1 | 1,000 | 900 | 1,000 | 1,200 | 30.3 | 3.3 |
| 2 | 1 | 1 | 250 | 225 | 250 | 300 | 7.5 | 3.3 |
| 3 | 2 | 1 | 250 | 225 | 127 | 152 | 4.7 | 2.1 |
| 4 | 1 | 2 | 250 | 225 | 500 | 600 | 12.2 | 5.4 |
| 5 | 4 | 1 | 500 | 450 | 125 | 150 | 10.8 | 2.4 |
| 6 | 10 | 1 | 250 | 225 | 25 | 30 | 5.4 | 2.4 |
| 7 | (3 extractions with Absolute Methanol) 1 | 1 | 110 | 99 | Methanol 100% (MeOH) 110 X3 total, 330 | (MeOH) 88 X3 264 | 3.8 | 3.8 |

It is possible to separate an additional portion of sesamolin by cooling the solution to 0° C. and filtering. The material in the filtrate then is oil with a small amount of sesamolin and sesamin, and this can be discarded because of the small amount of active materials present. In a continuous process, this residue could be combined with sesame oil for reextraction. The material in the filtrate is composed of a mixture of sesamolin and sesamin, and can be used for synergistic purposes with pyrethrins.

The Examples 1 through 6 show that with increasing volumes of γ-butyrolactone, greater weights of residues are obtained, whereas in any ratio less than one, the weights are nearly equal. In comparison, the weight of residue extracted from sesame oil by 3 separate treatments of absolute methanol in the ratio of 1:1 exceeds that extracted by one treatment of γ-butyrolactone by 13%. Since the maximum weight of useful solids is no greater than 1% to 1.5%, it is evident that γ-butyrolactone extracts less inert oil and other oil components than methanol.

The synergistically active fractions of Examples 1 to 7 thus obtained were tested for insecticidal activity. Pyrethrin insecticide compositions were made up by dissolving the amounts of pyrethrins and extracts noted in Table II in 100 ml. of odorless base oil. Evaluations were made by a modified procedure of the official Peet-Grady method of the National Association of Insecticide and Disinfectant Manufacturers, as described in Soap Bluebook (1942, McNair-Dorland Co., New York).

The modification consisted of using a circular chamber made of ¼" mesh wire screen fastened to a light wooden frame and lined inside on the walls and floor with 90# kraft paper. The chamber was 36" in diameter and 35" high, giving a volume of 20.6 cubic feet which closely approximated 1/10 of the volume of the official Peet-Grady chamber, 216 cubic feet of space. The top of the chamber was covered with a removable round plate glass top. After each test, new, clean paper was inserted into the chamber. The test dose of insecticide was modified to approximately 1.2 ml., or 1/10 volume that was used in the Peet-Grady procedure. The exact weight of each dose of spray was determined. The Devilbiss spray gun used in the official test was also used in the modified procedure.

Comparisons were made with the official test insecticide. The kill ratings are reported as OTI differentials in Table II below. About 200 adult flies, 4 days old, were used per test, four tests or replicas per dilution.

Table II

| Example No. | Test Insecticide, mgs. per 100 ml.[1] | | Percent KD,[2] 10 min. | Percent Kill | OTI, percent Kill | Percent OTI Diff. |
|---|---|---|---|---|---|---|
| | Pyrethrin | Extract | | | | |
| 1 | 50 | 200 | 96 | 42 | 33 | +9 |
| 2 | 50 | 200 | 94 | 51 | 44 | +7 |
| 3 | 50 | 200 | 97 | 68 | 47 | +21 |
| 4 | 50 | 200 | 94 | 57 | 53 | +4 |
| 5 | 50 | 200 | 98 | 63 | 38 | +25 |
| 6 | 50 | 200 | 83 | 43 | 36 | +7 |
| | | MeOH Extract | | | | |
| 7 | 50 | 200 | 83 | 23 | 34 | −11 |

[1] Solvent contained 25% acetone and 75% odorless oil.
[2] KD indicates percent flies knockdown in 10 minutes.

The extracts are quite active and in all instances more active than the OTI, excepting sample 7 which was extracted with methanol. The variation in activity of the samples is caused by the different weights of inert materials extracted from the crude sesame oil. The weight of samples 3 and 5 (see Table I) are approximately 40% less than the weight of samples 1 and 2. On the other hand, the synergistic activity of samples 3 and 5 exceeds that of samples 1 and 2 by an average OTI difference of 15% or about 30% more than the total possible OTI difference (+50%).

The low knockdown percentage in samples 6 and 7 indicates that a lower content of sesamolin and seamin per unit weight of residue was extracted.

The oil obtained after the extraction was subjected to the Villavecchia test for the presence of sesamolin or sesamol, and the Peet-Grady test for synergistic activity. The Villavecchia test was made by diluting 1 cc. of oil in isooctane to various dilutions, then adding 1 cc. of furfural (as a 3.0% solution in MeOH) and 2 cc. of sulfuric acid (as a 1–3 solution in H₂O) to each tube with vigorous shaking. Ten minutes were allowed for color development at 22° C. Data are given in Table III. The biological tests of the extracted oil are shown in Table IV. The tests were made by the modified Peet-Grady procedure described above.

Table III.—Villavecchia analyses

| Example No. | Dilution of Extracted Oil | Weight of Oil per Dilution, mgs. | Degree [1] of Color Reaction | Extraction Ratio of Oil to BO [2] by Volume |
|---|---|---|---|---|
| 1 | 1–100 | 9.0 | 0 | 1:1 |
| | 1–50 | 18.0 | 1 | |
| 2 | 1–100 | 9.0 | 0 | 1:1 |
| | 1–50 | 18.0 | 1 | |
| 3 | 1–25 | 36.0 | 0 | 2:1 |
| | 1–5 | 180.0 | 1 | |
| 4 | 1–100 | 9.0 | 0 | 1:2 |
| | 1–50 | 18.0 | 1 | |
| 5 | 1–400 | 2.25 | 0 | 4:1 |
| | 1–200 | 4.5 | 2 | |
| 6 | 1–800 | 1.125 | 1 | 10:1 |
| | 1–400 | 2.25 | 2 | |
| | MeOH Extract | | | |
| 7 | 1–800 | 1.125 | 1 | 1:1; 3X |
| | 1–400 | 2.25 | 2 | |
| | Crude Sesame Oil Not Extracted | | | |
| 8 | 1–1,600 | 0.525 | 1 | |

[1] 0=no color; 1=very slight red, transient; 2=very slight red, permanent for about 30 minutes; 3=distinct red; 4=maximum red.
[2] Ratio of oil to γ-butyrolactone by volume.

Table IV

| Example No. | Test Insecticide, mgs. per 100 ml.[1] | | Percent KD, 10 min. | Percent Kill | OTI, Percent Kill | Percent OTI Diff. |
|---|---|---|---|---|---|---|
| | Pyrethrin | Extract | | | | |
| Extracted Oils, Nos. 1–4 Pool | 50 | 461.0 | 53 | 33 | 42 | −9 |
| Non Extracted Crude Sesame Oil | 50 | 447 | 91 | 76 | 42 | +34 |
| No Oil Control | 50 | 0 | 78 | 24 | 36 | −12 |

[1] Solvent=25% acetone plus 75% odorless oil.

The extracted oil was shown to be substantially inactive by both tests, excepting for the single extractions at 4:1 and 10:1 ratios of oil to solvent (Examples 5 and 6). The results with Example 7 demonstrate that 3 extractions with absolute methanol at ratios of 1:1 fails to remove sesamol, sesamolin and sesamin from the oil as efficiently as γ-butyrolactone. The entomological assays with a sample of extracted oil prepared by pooling samples 1 through 4 shows that little synergistic activity remains in the oil after extraction with γ-butyrolactone.

EXAMPLE 8

A mixture of 51% sesamin and 38% sesamolin was prepared by washing 57 grams of sesame oil concentrate with one volume of hexane and filtering. The dried solids weighed 33 gms. The filtrate was freed of hexane by warming and saponified with a slurry of calcium hydroxide at pH 7.5. The soap was extracted with nitromethane 2 times and filtered. The filtrate was distilled at reduced pressure to remove the nitromethane. The dry residue weighed 19 grams and was pooled with the 33 gms. of solids above. These were dissolved in 275 ml. of n-amyl alcohol at 90° C. The solution was cooled slowly. At 60° C., crystals formed and the turbid solution was filtered at about 45° C. The removed crystals were washed in hexane and dried. Their melting range was 119° to 120° C. weighing 7 gms.

The alcoholic filtrate was evaporated under reduced pressure at about 55° C., and the residue was washed from the flask with acetone. The acetone filtrate was evaporated at 35°–40° C. The recovered solids weighed 41 gms. and were oily. These solids were washed on a filter once with about ⅓ volume of iso propyl ether and air-dried, yielding 38 gms. or 67% of synergistic compound. This preparation was mixed with other batches of synergistic compounds for entomological test. They were prepared essentially in the same manner, except hexanol or chloroform replaced n-amyl alcohol and methyl alcohol replaced nitromethane. The resultant solid, 51% sesamin and 38% sesamolin, was assayed by the modified Peet-Grady procedure. Data are given in Table V. The synergistic activity exceeds that of the extract by at least seven-fold.

*Table V*

| Example No. | Test Insecticide, mgs. per 100 ml.[1] | | Percent KD, 10 min. | Percent Kill | OTI, Percent Kill | Percent OTI Diff. |
|---|---|---|---|---|---|---|
| | Pyrethrin | Mixture of 51% Sesamin and 38% Sesamolin | | | | |
| Mixture of 51% Sesamin and 38% Sesamolin | 50 | 100 | 98 | 80 | 48 | +32 |
| | 25 | 100 | 98 | 61 | 45 | +15 |
| | 25 | 100 | 90 | 76 | 48 | +13 |
| Control | 25 | | 60 | 8 | 35 | -27 |

[1] Solvent=25% acetone and 75% odorless oil.

When the mixture of sesamin and sesamolin is assayed against the German cockroach in accordance with the procedures of the official CSMA cockroach spray test, unusually high insecticidal activity is observed, as shown in Table VI. The data show that the formulation containing pyrethrum and the mixture of sesamin and sesamolin in 1:1 ratio is as effective as pyrethrum and piperonyl butoxide in 1:4 ratio.

*Table VI.—Official cockroach test [2]*

| Synergist | Test Insecticide, mgs. per 100 ml. | | Ratio, Pyrethrin: Synergist | Average Percent KILL, 48 Hour | |
|---|---|---|---|---|---|
| | Pyrethrin | Synergist | | Test 1 | Test 2 |
| None | 100 | | | 87 | 88.5 |
| Mixture of 51— Sesamin and 38— Sesamolin [1] | 75 | 75 | 1:1 | 94 | 93 |
| Do | 75 | 150 | 1:2 | 94 | |
| Piperonyl butoxide | 75 | 300 | 1:4 | 93 | |

[1] Prepared by method shown in column 8, Example 8.
[2] Official method of the Chemical Specialties Manufacturers Association for Evaluation Cockroach Sprays. Soap and Chemical Specialties, Blue Book, page 249, 1956 (January).

The extracts obtained in accordance with the invention can be used as a synergist for pyrethrins in pyrethrin insecticides. Preferably, for optimum synergistic effect, they are modified so as to bring the proportions of sesamin and sesamolin within the ranges set forth previously. Typical of the insecticide formulations which can be used are those in the working examples. Any pyrethrin insecticide formulation, as known to those skilled in the art, can be used, and the extract in accordance with the invention is used in substitution for the sesame oil or piperonyl cyclohexenone constituent of such insecticides. It is customary in such formulations to employ from 20 to 100 mgs. of pyrethrins and from 100 to 400 mgs. of the synergist per 100 cc. of base oil. Other components can be present which have no effect upon the insecticidal activity of the pyrethrin but make the product more attractive from the marketing standpoint.

I claim:
1. A process for the extraction of pyrethrin synergists from sesame oil which comprises dissolving the oil in from 0.25 to 8 volumes of γ-butyrolactone at a temperature of at least 130° C. but below the boiling point of the γ-butyrolactone, cooling the resulting solution to a temperature below 60° C. at which the solution separates into a γ-butyrolactone layer and a sesame oil layer, separating the γ-butyrolactone layer from the sesame oil layer, and recovering pyrethrin synergists from the γ-butyrolactone layer.

2. A process in accordance with claim 1 in which the pyrethrin synergists recovered from the γ-butyrolactone layer are further extracted with from 0.25 to 8 volumes of γ-butyrolactone in order to separate residual oil therefrom.

3. A process in accordance with claim 1 which includes extracting the pyrethrin synergists recovered from the γ-butyrolactone layer with a sesamin oil solvent selected from the group consisting of isooctane, hexane, petroleum ether, and kerosene, separating the dissolved material from the undissolved material, distilling the solvent to recover the residue, saponifying the residue with aqueous calcium hydroxide in an amount to bring the pH of the mixture to a maximum of 7.7, extracting the saponified residue with nitromethane, and recovering pyrethrin synergists from the nitromethane.

4. A process in accordance with claim 3 in which the pyrethrin synergists recovered from the nitromethane are recrystallized from a lower aliphatic alcohol having from four to six carbon atoms.

5. A process in accordance with claim 1 in which the pyrethrin synergists recovered from the γ-butyrolactone are recrystallized from a lower aliphatic alcohol having from four to six carbon atoms.

6. A process in accordance with claim 5 in which the pyrethrin synergists recovered from the γ-butyrolactone are fractionated by dissolving them in a 10 to about 20% lower aliphatic alcohol solution, cooling the solution to room temperature to separate a sesamolin fraction, further cooling the resulting solution to 0° C. to separate an additional sesamolin fraction, and recovering from the solvent separated therefrom sesame oil mixed with sesamolin and sesamin.

7. A continuous process for the extraction of pyrethrin synergists from sesame oil which comprises blending a stream of sesame oil with a stream of γ-butyrolactone in the proportion of from 0.25 to 8 volumes of γ-butyrolactone per volume of oil, heating the blend to a temperature of at least 130° C. but below the boiling point of the γ-butyrolactone, cooling the resulting solution to a temperature below 60° C. at which the solution separates into a γ-butyrolactone layer and a sesame oil layer, continuously centrifugally separating the γ-butyrolactone layer from the sesame oil layer, recovering pyrethrin synergists from the γ-butyrolactone and recycling the γ-butyrolactone to process another portion of sesame oil.

8. A process in accordance with claim 7 in which the pyrethrin synergists recovered from the γ-butyrolactone layer are further extracted in a second extraction stage, exactly like the first, with from 0.25 to 8 volumes of γ-butyrolactone in order to separate residual oil therefrom, separating the oil and the γ-butyrolactone therefrom, and recycling both for reprocessing.

No references cited.